WALTER JUDA, INVENTOR.

BY Rines and Rines
ATTORNEYS

United States Patent Office 3,669,750
Patented June 13, 1972

3,669,750
FUEL CELL SYSTEM
Walter Juda, Lexington, Mass., assignor to Prototech Incorporated, Cambridge, Mass.
Continuation of application Ser. No. 260,457, Feb. 25, 1963. This application Dec. 24, 1968, Ser. No. 788,687
Int. Cl. H01m 27/00
U.S. Cl. 136—86                                        8 Claims

ABSTRACT OF THE DISCLOSURE

Stacked fuel cells in which successive anode and cathode electrodes are porous supports juxtaposed with a thin impervious conductive layer. Each anode support is provided with a thin hydrogen-permeable layer at the side thereof facing the electrolyte. Hydrogen-containing fuel is reformed in situ by providing reformation catalysts internally of the anode supports within the pores thereof. Fuel and oxidant are applied to one end of the anode and cathode electrodes, and vents are provided at the opposite end. Venting is assisted by electrode tapering or tilting.

---

Figure 1:
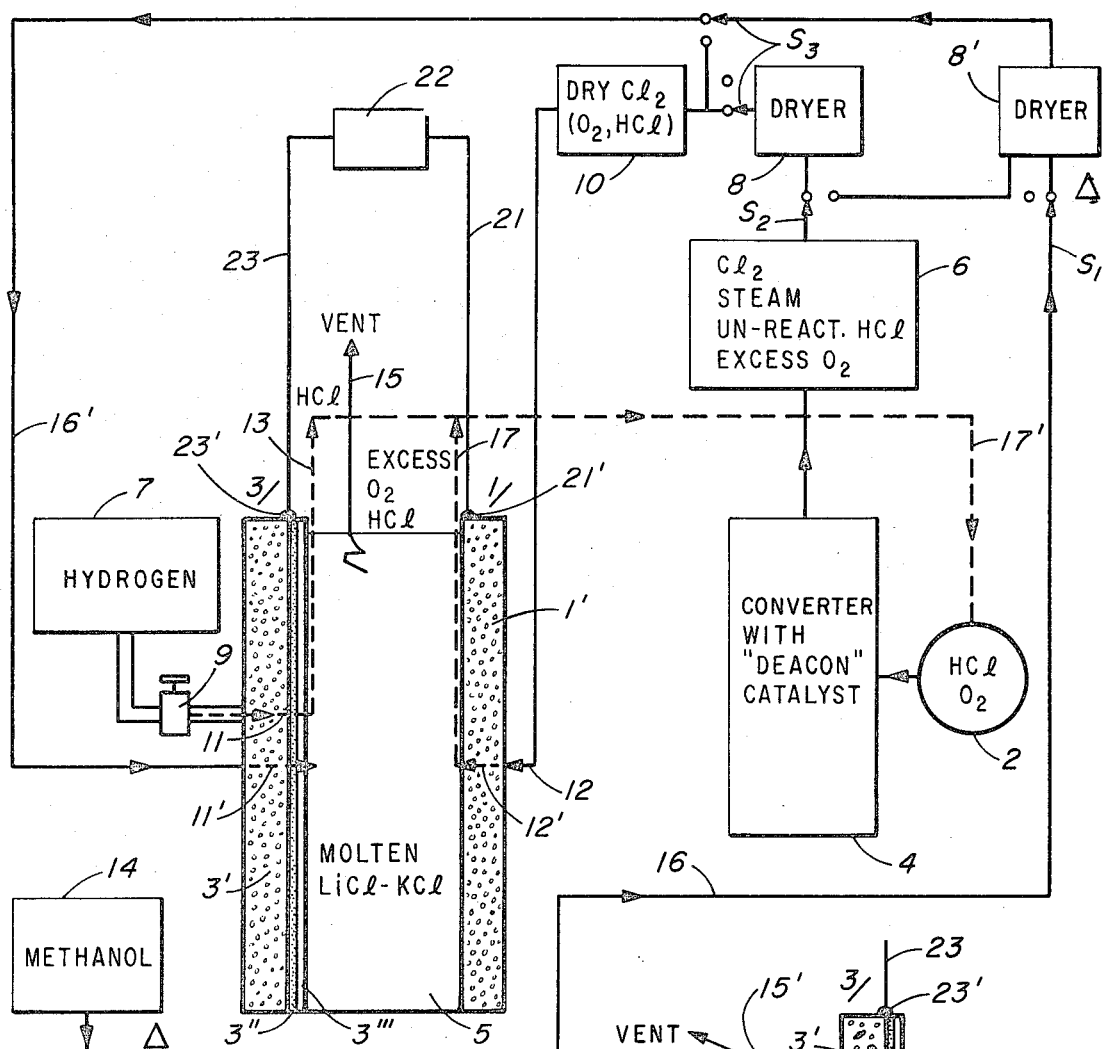

This application is a continuation of Ser. No. 260,457, filed Feb. 25, 1963, now abandoned, for "Fuel Cell System and Method."

The present invention relates to fuel cells and methods of operating the same, being more particularly directed to systems adapted to couple fuel-preparation and/or oxidant-preparation apparatus and components with fuel cells of superior performance. Prior-art fuel cells are of a variety of types, including cells operating at low temperature (below 100° C.), with aqueous alkaline electrolytes and employing relatively pure hydrogen and oxygen or air as the fuel and oxidant agents, respectively; high-pressure cells with aqueous alkali operating at the order of about 200° C.; acid electrolyte-containing cells, employing noble metal electrodes and, for example, phosphoric acid or an acid ion-exchange membrane, for operation with relatively impure hydrogen fuel; molten salt high-temperature cells employing alkali carbonates as electrolytic media and operating at temperatures in excess of, say, 600° C., which, again, may employ impure hydrogen fuel and air as the oxidant; and, more recently, very high temperature solid oxide cells, as of zirconium oxide and the like, operating at temperatures of the order of 1000° C.

Aqueous alkaline cells are sensitive to carbon dioxide contamination and, therefore, require purified hydrogen as a fuel. Aqueous acid cells, regardless of whether they have a liquid or solid electrolyte, suffer from poor oxygen reduction at the cathode, which has to comprise an expensive noble metal. The molten carbonate cells suffer from the highly corrosive character of the carbonate melts. The solid oxide cells, even when operated above 1000° C., still have a much higher internal electrical resistance than molten electrolytes.

In general, oxygen is difficult to ionize at an electrode. In alkaline low-temperature systems, the mechanism is believed to be complicated by the peroxide ion formation. In the high-temperature carbonate cell, carbon dioxide has to be added to the oxygen for the direct carbonate ion formation, which is a complication. The very high-temperature solid oxide cells, in which it is claimed that oxygen ions are formed, have the inherent difficulty of the high resistance of the oxides.

An object of the present invention, accordingly, is to provide a new and improved fuel cell and method of operating the same that shall not be subject to the limitations, complications and disadvantages above discussed; but, rather, through the utilization of a halogen electrode with an appropriate molten electrolyte, produce vastly new and improved results.

While in most fuel cells the preferred oxidant is oxygen (pure or air), oxygen does not ionize rapidly. For this reason, the present invention, in one of its important aspects, involves an intermediate, capable of being converted to an oxidant which ionizes rapidly at fuel cell cathodes; preferably hydrogen chloride which can be readily oxidized to chlorine and water. As intermediates, hydrogen iodide and hydrogen bromide may be used in place of the chloride, but the chloride is preferred because HCl has the highest free energy of formation of the three. Fluorine is also a suitable oxidant for the purposes of this invention, but the oxidation of HF must be accomplished by an input of energy, as, for example, by electrolysis, which operation makes the cells of this invention regenerative.

The important inexpensive and logistically desirable fuels, including hydrocarbons, alcohols, especially methanol, coal, and, possibly, wood derivatives and organic wastes, do not ionize rapidly or completely enough at anodes of fuel cells for direct use. One of the further inventive features of the invention, therefore, involves fuel preparation by an external or in situ conversion of such fuels into "impure hydrogen," as by thermal and/or chemical methods; preferably by reforming.

Hydrogen and chlorine are especially advantageous because their free energy content is equal to about eighty-five percent of that of, for example, the methanol-air system, and they are electrochemically reactive to an unusually high degree. The reason is that the electrochemical action at the anode and cathode, respectively, involves the direct loss and acquisition of an electron, rather than complicated and slow ionization mechanisms which hold for many other fuels and oxidants.

A further preferred feature of the invention resides in the use within the cell of a molten salt containing either halides or hydrogen ions. While hydrogen-halogen cells with an aqueous electrolyte have been previously operated, numerous advantages have been found to reside in the use of a molten salt. In the case, for example, of a hydrogen-chlorine cell with a molten salt, the following advantages, among others, result: (1) the polarization characteristics of the molten cell electrodes are significantly better than the aqueous low temperature cells, resulting in "flat" discharge curves and, therefore, high power density; (2) the molten cell produces gaseous hydrogen halide, usually at the anode, which requires no heat to be volatilized; (3) in a molten salt high-temperature cell, the heat produced in the cell due to the inefficiency is at a temperature level which permits its use for the reforming or other conversion of the fuel to hydrogen; (4) in the molten cell, furthermore, the electrolyte is invariant because the halide produced, as well as the excess oxygen and air, are not soluble in the bath; and (5) the electrolyte resistance in the molten cell is much lower than that in the aqueous cell, being, in fact, negligible with regard to polarization resistance, so that the geometric arrangement of the cell requires no extreme in close spacing of the electrodes with respect to each other.

Another object of the invention is to provide a novel fuel-cell electrode structure, especially a catalytic anode structure capable of producing hydrogen from carbonaceous fuels and electrochemically oxidizing the hydrogen so-produced, and preferably comprising a hydrogen-diffusable, but otherwise impervious palladium-containing film; and other fuel-cell structure sub-combinations of more general utility, also.

Other and further objects will be explained hereinafter and will be more particularly pointed out in connection with the appended claims.

Figure 3:
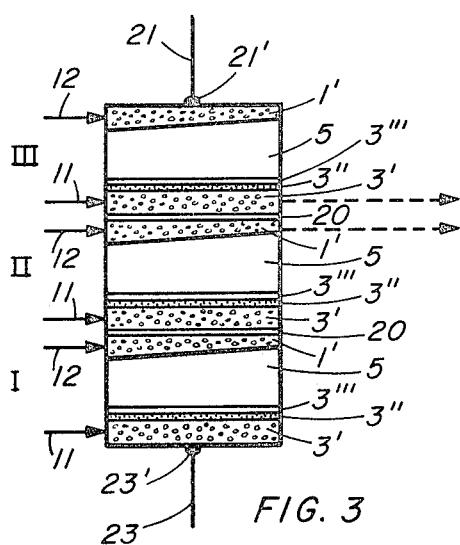
Figure 2:
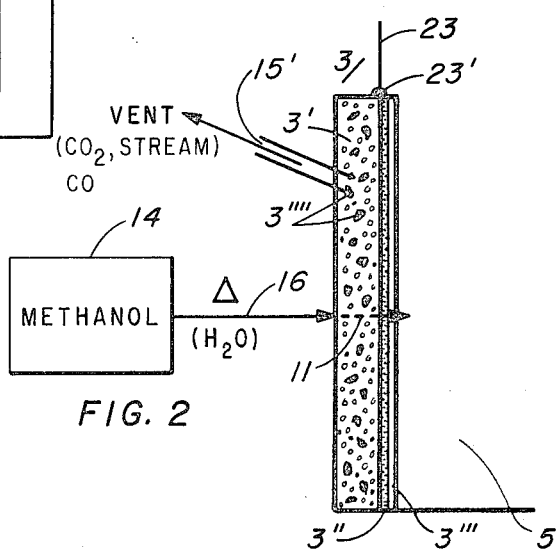

The invention will now be described in connection with the accompanying drawing, FIG. 1 of which is a schematic diagram of a preferred combined fuel-preparation and fuel-cell construction, the latter being illustrated in longitudinal cross-section;

FIG. 2 is a similar view of a modification adapted for in-situ reforming of fuel at the fuel-cell anode region; and FIG. 3 is a similar view of a multiple-cell construction embodying cells of the type shown in FIGS. 1 and 2.

Referring to FIG. 1, a preferred cell is shown bounded by two electrodes, one being a novel hydrogen anode 3 and the other a halogen cathode 1, the cell containing molten halide or hydrogen-ion-containing-electrolyte at 5, and operating with an external "Deacon-type" apparatus. In this specific illustration, the electrolyte is molten LiCl-KCl, and the Deacon apparatus effects oxidation of hydrochloric acid to chlorine and water, the chlorine to be fed to the cathode 1.

Both the hydrogen anode 3 and the chlorine cathode 1 are constituted of porous members in order to enable the respective introduction of hydrogen at 11 or 11' and chlorine at 12 or 12'. In the illustrated cell, the electrodes 1 and 3 comprise porous graphite or other porous conductive supporting members 1' and 3', with the anode 3 being provided with a silver layer 3" that has been secured to the porous carbon support 3', as by sintering thereto, and a preferably thin palladium-containing layer or sheet 3''' connected with the silver layer 3". The palladium-containing layer will, as later explained, be impervious to all gases except hydrogen, which is inherently permitted to diffuse therethrough.

Electrical conductors 23 and 21 are respectively connected, as at 23' and 21', to the anode 3 and cathode 1 in order to enable the conducting of electric current out of the cell to an appropriate load, schematically illustrated at 22.

In order to illustrate the operation of the cell of FIG. 1, and the versatility of the same, the hydrogen fuel is shown available either from a source of pure hydrogen 7 through an outlet 9, or from methanol or hydrocarbon or similar carbonaceous fuels, a source of which is indicated at 14. In the latter event, relatively impure hydrogen will be applied to the anode 3.

As later discussed in connection with the embodiment of FIG. 2, reforming of the methanol or other fuel may also be effected in situ at the anode 3. In such event, when operating with the external Deacon system for oxidizing hydrochloric acid, in the case of the chloride cell, the single external unit provides for heat exchange between the exothermic oxidation of HCl and the endothermic reforming reaction of methanol or hydrocarbons. Since the Deacon process operates well at temperatures of the order of 400° C., and methanol is easily reformed at this or somewhat lower temperature, there is a "fit" between methanol reforming and HCl-air oxidation. Two-step conversion of hydrocarbons, involving a low temperature, i.e., 460° C. partial oxidation, coupled with reforming at about the same temperature, may also be employed for external or in situ gasifying.

With regard to the hydrogen-chlorine fuel cell, which is to be supplied with impure hydrogen and dilute chlorine from the external unit or units, the following considerations are important. The chloride (or other halide) electrolyte is insensitive to the gases admixed with hydrogen in the fuel, primarily $CO_2$. In the chloride cell, it is generally desirable to have the fuel converted to hydrogen and $CO_2$ to the greatest possible extent because hydrogen is the most effective fuel. This is the reason for preferring reforming.

In the event of the feeding of impure hydrogen, produced either externally or in situ, to the anode 3, automatic separation of the hydrogen gas from the cell product and from carbon dioxide is effected by the impervious palladium-containing layer or film 3'''.

With a porous anode 3, the diluent (especially $CO_2$) present in the hydrogen will pass into and out the electrolyte 5. Since, in a chloride melt, hydrogen chloride is formed at the porous anode 3, there evolves from the cell a mixture of $CO_2$ and HCl and some residual hydrogen, as indicated at 13. If the chlorine supplied to the cell comes as a gas mixture of chlorine, nitrogen and some oxygen from the external Deacon process at 12, and if no means is supplied to separate the cathode gas from the anode gas, then the cell produces a mixture of $CO_2$, nitrogen, small amounts of residual hydrogen, and significant amounts of oxygen, and of hydrogen chloride.

When the hydrogen-containing mixture is fed to the palladium-containing layer 3''', which will permit diffusion therethrough only of hydrogen and is impermeable, as before stated, to $CO_2$ and the other gases in the impure hydrogen, the dilution of the cell gas with $CO_2$ and the like is automatically prevented. The palladium-containing layer 3''' acts as a built-in hydrogen purifier; prevents flooding of the electrode; provides a uniform hydrogen flux at the solid-liquid interface; permits the use of "electrolyte-sensitive" conducting supports, for example, porous stainless steel, nickel, etc.; is more broadly suitable for use, also, in $CO_2$-sensitive electrolytes, e.g. alkali hydroxide; makes high hydrogen utilization per pass possible because of the low "down-stream" hydrogen pressure; prevents dilution of fuel with cell product; and minimizes dilution of cell product with hydrogen. Indeed, there is no, or little, gaseous hydrogen coming through under discharge because of the electrochemical oxidation of hydrogen catalyzed by palladium, which is perhaps best represented by

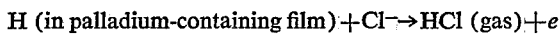

$$H \text{ (in palladium-containing film)} + Cl^- \rightarrow HCl \text{ (gas)} + e$$

It is desirable to provide as thin a palladium-containing film 3''' as is practically attainable in self-supporting form, both for cost reasons and because the hydrogen diffusion at any given temperature is proportional to thickness of the film. When palladium-containing films become too thin, they are not strong enough. Films of 0.0008" thickness have been made and experimentally used in diffusers. Palladium films in the range of 0.0001–0.005" thickness are preferred. For thicker layers, i.e., exceeding 0.002", self-supporting tubes may be used as the electrodes; for example, tubes having of the order of 1/16" outer diameter. The thinner palladium films may be deposited as an alloy metal on a porous conductive support, such as the porous carbon 3'. Suction may be used to contact a palladium or a palladium-containing foil or layer with the porous support 3', and heating this assembly to alloying temperatures whereby the layer 3''' becomes secured to the silver layer 3" carried by the support 3'. Alternatively, palladium or palladium-containing powders may be used to fill the surface pores of the conductive support and the surface is subjected to sintering temperatures whereby the porosity is eliminated.

Pure palladium metal has the drawback of changing crystal structure, and shrinking, when cooled in the presence of hydrogen. The diffusivity of hydrogen, furthermore, is improved by addition of some silver. The transition of the crystal structure is avoided by certain palladium alloys, especially Ag-Pd alloys, but also B-Pd alloys, and others. An Ag-Pd alloy containing about 70–75% palladium and 25–30% silver is especially advantageous in that it has no transition point in the presence of hydrogen and near maximum hydrogen diffusivity. The palladium-containing layer 3''', referred to above, includes suitable palladium alloys, especially silver alloys, having these advantageous characteristics.

While particularly useful in the specific type of cell of FIG. 1, it should be noted that palladium-containing anodes are also especially useful in the usual low or intermediate-temperature alkaline fuel cells. A reforming anode (e.g. a methanol reforming anode) is especially useful in fuel cells operated at, say, methanol reforming temperatures. Pure hydrogen must be used with porous anodes in an alkaline fuel cell because any $CO_2$ impurity converts the alkali to an alkali carbonate. A palladium film anode permits the use of a mixture of impure hydrogen with $CO_2$ in an alkaline cell because of the built-in purification factor. The palladium-containing anodes are, furthermore, useful, also, in the molten carbonate fuel cells, where the cell product is $H_2O$ and $CO_2$ evolved at the anode. The impervious palladium-containing anode avoids the dilution of the feed with these cell products.

The external one-step Deacon process of FIG. 1 may be used in the following manner. HCl gas is produced in, for example, the molten chloride fuel cell at the hydrogen anode 3, preferably at the impervious palladium-containing layer 3'''. When evolved from the cell at 13, it is admixed with air (100 parts HCl, 94 parts air) and this mixture is then fed, together with excess $O_2$ and HCl from the cathode 1 at 17, as indicated at 17', to the oxidation or converter step 2-4 of the Deacon process. The catalytic converter chamber 4 may contain $CuCl_2$ and rare earth chlorides, as discussed, for example, by W. F. Engel et al. in Chemistry and Industry, Jan. 13, 1962, "Recent Developments in the Oxidative Recovery of Chlorine From Hydrochloric Acid." The thermodynamics are such that within the range of 430–475° C., between sixty percent and seventy percent of the HCl feed to the oxidation step is converted to chlorine. In the above example, there is obtained 73 parts per weight of chlorine; 25 parts per weight of HCl are unreacted; and 58.5 parts per weight of water are formed. The resulting mixture, at 6, is first dried, for example, by passing it over a first silica gel dryer 8, yielding at 10 a mixture of chlorine, residual HCl and oxygen. This mixture is then fed to the cathode 1 of the fuel cell at 12 and therethrough at 12', where the chlorine is converted to chloride, permitting the residual HCl, and $O_2$, to pass out of the cell at 17. The HCl may be stripped from this exhaust gas by adsorption in water at 17 or, preferably, by stripping the gas by means of an aqueous hydrochloric solution containing HCl in concentration higher than corresponds to azeotropic composition. HCl gas is recovered at 2 from this stripping solution by heating. The heat required can conveniently be obtained, either from the inefficiency of the cell itself or by utilizing the heat produced in the Deacon process. Alternately, HCl and water may be stripped out of the Deacon gas, for example, by the above HCl stripping solution, prior to admitting the chlorine to the cathode.

When a silica gel dryer 8, for example, is used to remove the moisture from the chlorine produced in the Deacon process, it is advantageous to regenerate the silica gel by means of, for example, hot methanol vapors. Thus, for example, a second dryer 8' may have been first employed to remove moisture from the chlorine, and then it may be switched as at $S_1$, $S_2$ and $S_3$, to receive hot methanol from the source 14 along path 16. The hot methanol vapors which have picked up the moisture from the silica gel at 8' can then either be reformed separately at 16', FIG. 1, or they can be reformed in situ at the anode 3, FIG. 2.

When bromine or iodine are used in conjunction with molten fuel cells of this character, well known oxygen or air oxidations of the hydrogen halide may be used to produce the halogen and water, as later described.

Suitable molten chloride electrolytes 5 includes the alkali chlorides, for example, lithium chloride-potassium chloride (58–42), operating at, for example, 400–420° C. Operating the fuel cell at or above methanol (or other fuel) reforming temperatures and at or near the temperature level of the HCl oxidation by air permits good heat utilization and simplifies the flow sheet. Thus, the molten salt system has decided advantages over the aqueous system.

The invention, however, is not restricted to external fuel-preparation apparatus; the molten hydrogen-halide cell being particularly suited for highly advantageous in-situ fuel preparation and utilization, as shown in FIG. 2.

One advantage of the molten halide fuel cell, indeed, is the possibility of operating at temperatures permitting the reforming or other chemical transformation of fuels with the utilization of the heat of the cell. Specificially, for example, the reforming of methanol with steam is endothermic and takes place practically quantitatively at temperatures between 150–350° C.

When hydrogen is supplied to the anode 3 from an external source, only a noble metal catalyst is required (platinum, palladium, etc.). The reforming anode 3 of FIG. 2, however, is characterized by the presence of two catalysts within the anode: (1) adapted to the reforming reactions which produces $H_2$ and $CO_2$ and/or CO from the fuel and (2) to ionize the hydrogen so produced. Thus, in the combined hydrogen-electrode-in situ-reforming arrangement of FIG. 2, copper and zinc reforming catalysts 3'''' may be deposited within the porous carbon support 3'. This may, for example, be effected by impregnating the carbon with zinc and copper sulfate, drying the same, precipitating with an alkali carbonate, and reducing with hydrogen as described, as an illustration, in U.S. Letters Patent No. 2,425,625.

In the case of the molten chloride cell, the usual methanol reforming catalysts are non-noble metals subject to corrosion by the molten halide bath in the absence of a reducing amtosphere. Thus, if a porous anode 3 is used which does not prevent contact between the molten electrolyte and the reforming catalysts, care must be taken to provide a reducing atmosphere at all times to prevent losing the reforming catalyst to the molten bath. When the impervious Pd-Ag film 3''' is used on top of a porous base support 3'-3'', as before described, however, the precaution of the reducing atmosphere at all times becomes unnecessary.

A modification of the in situ utilization of fuels in the molten chloride cell is utilization of hydrocarbons at temperatures of the order of 460° C., combining partial oxidation of the hydrocarbons, to alcohols, and aldehydes and the like with reforming of these products. The molten halide bath cell, or other molten salt fuel cell, e.g. molten alkali carbonate cell, may also be operated at temperatures of direct cracking or reforming of hydrocarbons, for example, above 600–800° C. In this case, nickel may be used as the reforming catalyst, the nickel to be protected from the molten bath by means of the impervious Pd-Ag film 3'''.

When oxygen is used in the Deacon process, as above described, it is possible to limit the cell effluent treatment to the removal of water and re-use both oxygen and chlorine in conjunction with the HCl produced at the anode, as shown in FIG. 1. Thus, a plant operating on methanol and (liquid) oxygen, for example, is advantageous in the case of a submarine. A similar advantage is derived when an oxygen-selective film, such as a thin silver film permitting the selective flow of oxygen through the membrane, is provided.

In the submarine application or the application where liquid oxygen is employed, there is no loss of oxygen and there is also no separation problem in the cell, as before described. It will be noted, moreover, that the switching of dryer paths 8-8' at $S_1$, $S_2$ and $S_3$ will enable one of the dryers to be used in the Deacon process to produce the dry chlorine, while the other moist dryer is employed in the methanol conversion stream. Water and concentrated $Cl_2$ may be readily vented, as at 15, from the cell, with the water being condensible for re-use in the submarine and the $CO_2$ indeed, being usable in present-day submarine $CO_2$-elimination equipment.

Clearly, however, the cell and system are more generally useful in other locations as well. With the in-situ reforming apparatus of FIG. 2, indeed, the cell is self-sustaining, being about sixty percent efficient, and producing about forty percent of heat of sufficient temperature required for the conducting of the reforming and Deacon-process operations. The in situ reformation concept and novel anode construction, indeed, is applicable with any type of fuel cell operated at a temperature permitting adequate hydrogen diffusion. By combining the reforming anode in the cell, a built-in heat exchanger is provided, with the metal layer or film 3''' being excellent for heat exchange.

Experimental $H_2$-$Cl_2$ molten chloride fuel cells of the above-described construction have been successfully operated. With a molten KCl and LiCl (4 p.:3 p.) electrolyte 5, a suitable operating temperature was determined at between 390–450° C. A convenient way to melt the mixtures of two salts consisted in premixing LiCl and KCl (3 p:4 p.) and then melting successive portions of the mixture.

As an example, in an experimental apparatus employing a porous graphite platinized anode 3 and a porous graphite cathode 1, each of area of about 1.22 cm.$^2$ (¼" thick, 12 mm. in diameter), separated by about 5 mm. in a LiCl-KCl molten electrolyte 5, maintained at a temperature of about 420° C., chlorine was applied at 12' with a flow pressure of about 5" of Hg, and hydrogen was applied at 11 with substantially the same pressure. The porous graphite was of the PC 53H type (Stackpole Carbon Co., St. Mary's, Pa.), having a total porosity of 1.60 cm.$^3$/gram (77%), an apparent density of 0.48, a real density of 2.08, a fine porosity of about 61% (pore size 0.2–10 microns), and an electrical resistivity of 0.0018 ohm per inch. The anode 3 was platinized by soaking the carbon in a 10% solution of platinum chloride, drying the same, and reducing it with hydrogen at temperature. Discharge curves were produced, providing an open-cell voltage of about 1.53, whereas thermodynamic HCl considerations would have predicted a voltage of about 1.0. The excess voltage was unexpectedly found to occur from a concentration potential. The voltage-current relationship, as the resistance between anode and cathode was decreased, showed an excellent current density; for example, 144 ma./cm.$^2$ at 0.68 volt.

As another example, a cell of the type described in connection with the embodiment of FIG. 1 was constructed with a carbon cathode 1, about 12 mm. in diameter, separated about 1 cm. from a Pd-Ag closed-ended alloy tube anode 3, about ⅟₁₆" diameter, by an LiCl-KCl molten electrolyte 5 maintained at a temperature of about 420° C. The graphite for the carbon was the type NC60 of the National Carbon Co. of New York, N.Y., pore size 10–70 microns, with a total pore volume of about 0.3 cm.$^3$/gram. Hydrogen was introduced at 11 with about 2½" of pressure of Hg and chlorine was introduced at 12', FIG. 1, with about 1½" of pressure. An anode current density at 0.45 volt of 110 ma./cm.$^2$ was obtained. It was observed, moreover, that the usual bursts of excess hydrogen exploding with excess chlorine in the cell did not occur in this experiment; that is, the palladium-containing anodic layer 3''' minimized the entry of excess hydrogen into the cell electrolyte.

As still another example, very much larger current densities were obtained with a Pd-Ag-anode layer 3''' about 7" long and ⅟₁₆" in diameter, employing a 1" long porous carbon cathode 1 (PC 57H, Stackpole Carbon Co.) 5 mm. in diameter, with the same electrolyte and temperature described in the above illustration. An unexpected and unusually high cathodic current density was obtained as follows: at 0.9 v., 240 ma./cm.$^2$; at 0.5 v., 900 ma./cm.$^2$; 0.4 v., 1055 ma./cm.$^2$; 0.3 v., 1210 ma./cm$^2$; and near short circuit at 0.08 v., 1530 ma./cm.$^2$.

As still another example, in spite of the instability of HI at high temperatures, a hydrogen iodine cell of the above-described construction has been successfully operated to produce 0.94 volt at open circuit and 68 milliamperes of current at 0.16 volt, with a molten electrolytic medium 5 of KI (180 grams), NaI (360 grams) and KCl-LiCl (245 grams with 4:3 ratio) maintained at about 485° C., employing a Pd-Ag anode 3 compressing a ⅟₁₆" diameter tube, 3 mils thick, spaced about 2 cms. from an NC 60 porous carbon cathode 1 formed as a cylinder, 13 mm. in diameter and 1 cm. long.

As still a further example, if a molten bromide electrolyte, such as similar proportions, of NaBr or KBr with the KCl-LiCl melt above-described, is employed with a bromine cathode, the results obtained are similar, the hydrogen-bromine cell being intermediate the hydrogen-chlorine, hydrogen-iodine cells in performance.

In connection with in situ reformation, FIG. 2, as an additional example, a carbon anode having a pore volume of about 0.56 cm.$^3$/gram (or about 50% void volume) and an average density of about 0.90 gram/cm.$^3$ is suitable as the catalyst support for the methanol-reforming reaction. As described in the before-mentioned Letters Patent, the catalyst 3'''' may be deposited within the porous anode, the precipitation of the catalyst being carried out to the extent of filling approximately one-fourth of the void volume of the carbon. A one-half inch thick carbon electrode containing this reforming catalyst serves as the support for the palladium-containing film 3'''. Such an anode, in the cell of FIG. 2, used with a mixture of steam and methanol (in ratio of 3 moles of steam to 1 mole of formaldehyde) permits current densities of the order of 50 ma./cm.$^2$ at 0.4–0.6 volt, more or less, at a cell temperature of the order of about 400° C. It should be observed that the excess steam, $CO_2$, and traces of CO will be discharged or vented at 15', FIG. 2, from the anode 3 external to the electrolyte without contaminating the cell product; for example, HCl.

While the systems of FIGS. 1 and 2 have been described in connection with a so-called one-step Deacon process, it is, of course, to be understood that other types of processes of this character may also be employed. As an illustration, it may be advantageous to separate the oxidation of HCl to chlorine and water into two steps. In the first step, oxygen or air is contacted with one or more salts comprising an appropriate metallic chloride, at a suitable temperature, for example, of the order of 300–500° C., forming the corresponding metal oxide and chlorine. The chlorine, which may be admixed with an excess of oxygen or air, is then fed to the cells of this invention, and the hydrogen chloride produced in the cell may then be reacted with the metallic oxide formed in the first step, producing steam and reconverting the oxide to the corresponding chloride. The HCl-metallic oxide reaction constitutes the second step. For continuous operation, this intermittent process can be carried out with two units, one accomplishing the first step, the other the second step. Suitable metallic chlorides for this two step conversion are those having similar energies of formation of oxide and chloride, for example, ferric chloride, chromic chloride, and the like. If $FeCl_3$ is used, it is desirable to depress its vapor pressure by suitable additives, such as alkali chlorides.

Single cell units have been described in connection with the embodiments of FIGS. 1 and 2, but the invention is by no means limited to such single-cell construction. In commercial applications, indeed, where power is desired, the cells of the present invention may be composited into multiple cell constructions. The very nature of the novel hydrogen-halogen cells of the present invention provides most advantageous features in multiple cell constructions, such as, for example, the type illustrated in FIG. 3. While FIG. 3 is described in connection with cells of the type illustrated in FIG. 1, it is, of course, to be understood that cells embodying anodes of the type illustrated in FIG. 2 may also similarly be composited. In the embodiment of FIG. 3, a plurality of cells, I, II and III, is illustrated, preferably, although not in all cases essentially, disposed horizontally, one above the other, for a reason later explained. In between the cathode 1' of the lowermost cell I, and the anode 3' of the second cell II, a silver or other impervious conductive sheet 20 is disposed that conveniently serves the multiple functions of separating the anode gas (such as the hydrogen applied at 11) and the cathode gas (such as the chlorine applied at 12), and automatically establishing series electrical connection between the cathode and anode of the adjacent cells I and II. Similarly, a gaseous barrier 20 is interposed between the cathode 1' of the cell II and the anode 3' of the cell III, establishing, also, series electrical connection therebetween. While but three multiple cells are illustrated, it is to be understood that any desired number of cells may, in this manner, be conveniently assembled to suit the necessary voltage requirements.

One of the further advantages of the horizontal orientation with vertical stacking of the successive cells resides in the fact that the anodic palladium-containing layer 3''' will serve as the base of each of the cells I, II, III, etc., preventing the leakage of any of the cell products in view of the impervious character of the palladium-containing layer.

It will be observed that any excess fuel, such as the hydrogen applied at 11 to each of the porous anode members 3', may conveniently be vented, as illustrated by the dotted line arrow. Similarly, excess oxidant, such as the chlorine, may escape as shown in dotted lines. In order to aid the latter process, the cell may either be slightly tilted so that the gas readily funnels out or, equivalently, the electrodes, such as the cathode 1', may be somewhat tapered, as illustrated, to effect this result, if desired. It will be observed, moreover, that the present invention enables the employment of but two external electrical connectors 21', 23', irrespective of the number of cells composited into the multiple arrangement.

Further modifications will occur to those skilled in the art and all such are considered to fall within the spirit and scope of the invention as defined in the appended claims.

What is claimed is:

1. A multiple fuel cell construction having, in combination, a plurality of stacked cells incuding in sequence, a cathode, a molten electrolyte, an anode, a gas-impervious conductive sheet, a cathode, a molten electrolyte, and an anode, the first-mentioned anode and the second-mentioned cathode being juxtaposed with and electrically connected to said conductive sheet at opposite sides thereof, each anode comprising a support of porous material with a much thinner hydrogen-permeable otherwise impervious layer secured thereto on the side facing the adjacent electrolyte, said gas-impervious conductive sheet being much thinner than its anode support and being supported thereby, means for introducing oxidant adjacent to the cathode, and means connected to one end of each porous anode support for introducing hydrogen-containing fuel through the pores of the porous support, a vent connected to the opposite end of each porous anode support, the pores of each porous anode support being provided with reforming catalyst internally of the support, and said cell being provided with means for maintaining the electrolyte at a temperature of the order of 400° C. and above, whereby hydrogen-containing fuel may be reformed in situ in the porous anode supports to provide hydrogen which diffuses through said hydrogen-permeable layers and other products which are vented from said porous anode supports, each porous anode support defining gas flow paths between its fuel introducing means and its vent which are substantially parallel to the planes of its hydrogen-permeable layer and its gas-impervious conductive sheet.

2. A multiple fuel cell construction as claimed in claim 1 and in which the said layer is palladium-containing.

3. A multiple fuel cell construction as claimed in claim 1 and in which the said electrolyte is selected from the group consisting of carbonates and alkali hydroxides.

4. A multiple fuel cell construction as claimed in claim 1 in which said means for introducing oxidant comprises means for introducing a halogen and in which the said electrolyte contains ions of the halogen.

5. A multiple fuel cell construction as claimed in claim 1 in which said cathodes are porous and are tapered from end-to-end, in which said oxidant is introduced into said cathodes at the wider ends and in which means is provided for venting excess oxidant from the narrower ends of said cathodes.

6. A multiple fuel cell construction as claimed in claim 1 and in which the said cells are tilted with respect to the vertical.

7. A multiple fuel cell construction as claimed in claim 1 in which said cathodes are porous supports and in which said means for introducing oxidant are connected to one end of said porous cathode supports.

8. A multiple fuel cell construction as claimed in claim 7 in which said supports have vent means at the opposite end thereof.

References Cited

UNITED STATES PATENTS

| | | | |
|---|---|---|---|
| 3,291,643 | 12/1966 | Oswwin et al. | 136—86 |
| 3,275,476 | 9/1966 | Rightmire et al. | 136—86 |
| 3,148,089 | 9/1964 | Oswin | 136—86 |
| 2,572,296 | 10/1951 | Zimmerman et al. | 136—86 |
| 2,924,634 | 2/1960 | Fischbach et al. | 136—86 |
| 3,135,674 | 6/1964 | Ruetschi | 204—284 |
| 3,337,369 | 8/1967 | Frazier | 136—86 |
| 2,384,463 | 9/1945 | Gunn | 136—86 |
| 2,928,783 | 3/1960 | Bacon | 136—86 |
| 3,152,013 | 10/1964 | Juda | 136—86 |
| 3,236,691 | 2/1966 | Reger et al. | 136—86 |
| 409,365 | 8/1889 | Mond et al. | 136—86 |
| 2,890,259 | 6/1959 | Weininger | 136—86 |
| 2,921,110 | 1/1960 | Crowley et al. | 136—86 |

FOREIGN PATENTS

| | | | |
|---|---|---|---|
| 401,612 | 7/1909 | France | 136—17 |

WINSTON A. DOUGLAS, Primary Examiner

H. A. FEELEY, Assistant Examiner